March 17, 1970 JAMES E. WEBB 3,501,750
ADMINISTRATOR OF THE NATIONAL AERONAUTICS
AND SPACE ADMINISTRATION
DATA COMPRESSION PROCESSOR
Filed Sept. 19, 1967 2 Sheets-Sheet 1
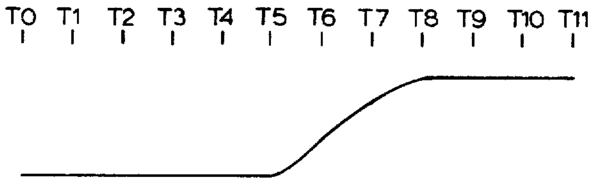
FIG. 1
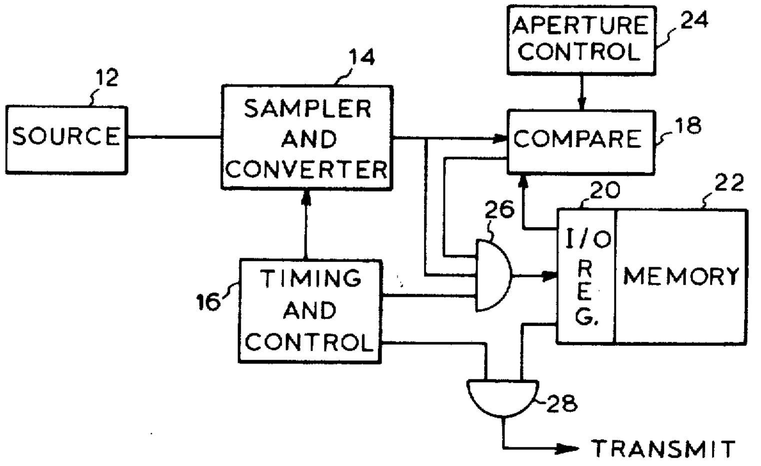
FIG. 2 *PRIOR ART*
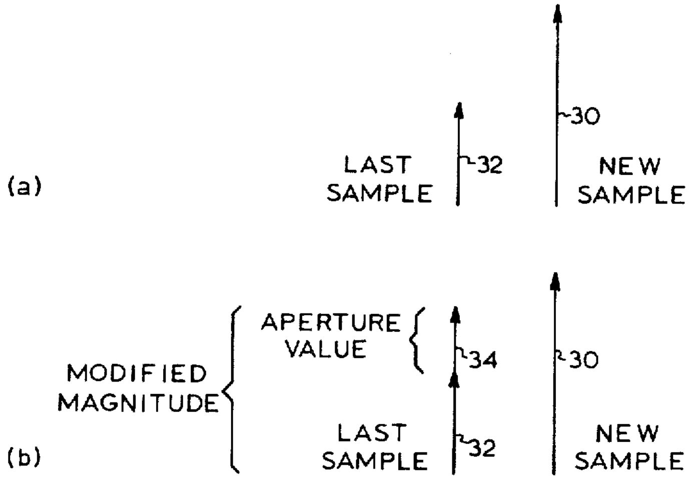
FIG. 3
INVENTOR.
TAGE O. ANDERSON
BY
ATTORNEYS

INVENTOR.
TAGE O. ANDERSON
BY
ATTORNEYS

United States Patent Office 3,501,750
Patented Mar. 17, 1970

3,501,750

DATA COMPRESSION PROCESSOR

James E. Webb, Administrator of the National Aeronautics and Space Administration, with respect to an invention of Tage O. Anderson, Arcadia, Calif.

Filed Sept. 19, 1967, Ser. No. 668,969
Int. Cl. G06f *1/00*
U.S. Cl. 340—172.5 9 Claims

ABSTRACT OF THE DISCLOSURE

A processor responsive to a sampled analog signal for selecting only those samples whose values differ from a previously selected sample by more than a predetermined amount or aperture value. The processor determines whether a new sample should be selected by initially comparing it with the last selected sample and then modifying the smaller of the two samples by adding the aperture value thereto. The modified and unmodified samples are then compared and if the result is the same as the result of the first comparison, it indicates that the new sample differs from the last selected sample by more than the aperture value and thus should be selected.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

Many applications exist in which it is necessary to monitor an analog signal and this is often done by periodically sampling the signal and coupling the sample magnitudes to a data processing system. In situations where the analog signal source is located remote from the data processing system, as in spacecraft applications, data compression means are incorporated between the signal source and the transmission channel to the data processing system in order to minimize the amount of data that need be transmitted. Such data compression means are based on the concept that it is only necessary to select significant data, i.e. data representing changes in the analog signal level, for transmission to the data processing system. Insignificant data representing no change in the analog signal level is discarded prior to transmission. Thus, the data compression means must include apparatus for comparing each new sample with the last selected sample to determine whether the new sample differs from the last selected sample by more than a defined aperture value.

Description of the prior art

In prior art systems, a special purpose data compression means is often used which adds and subtracts the aperture value from the last selected sample. Two quantities so formed are compared with each new sample and if the new sample falls between the levels of the two quantities, it is not significant. This procedure requires two arithmetic operations (i.e. addition and subtraction) and two comparison operations.

It is an object of the present invention to provide a simpler, and thus less expensive and more reliable, data compression means.

SUMMARY OF THE INVENTION

Briefly, in accordance with the present invention, a data compression means is provided which compares a new sample with the last selected sample by adding the aperture value to the smaller of the two. If the thus modified sample is still smaller than the unmodified sample, the new sample is significant and should be selected. Thus, an embodiment of the invention requires only one arithmetic operation in addition to two comparison operations.

In accordance with a significant aspect of a preferred embodiment of invention, the aperture value is restricted to being a binary integer thus enabling it to be added to a sample by merely pulsing one stage of a counter in which the sample is stored.

In accordance with a further aspect of the invention, samples determined to be significant are sequentially loaded into a buffer memory from which they are sequentially extracted for transmission, as for example to a data processing system. Means responsive to the fullness of the buffer memory are provided for controlling the aperture value.

BRIEF DESCRIPTION OF THE DRAWINGS

FIGURE 1 illustrates an arbitrary analog waveform;

FIGURE 2 is a block diagram of a system in which an embodiment of the present invention can be utilized;

FIGURE 3 is a diagram illustrated to facilitate an explanation of the operation of an embodiment of the invention.

DESCRIPTION OF THE PREFERRED EMBODIMENTS

Figure 4:
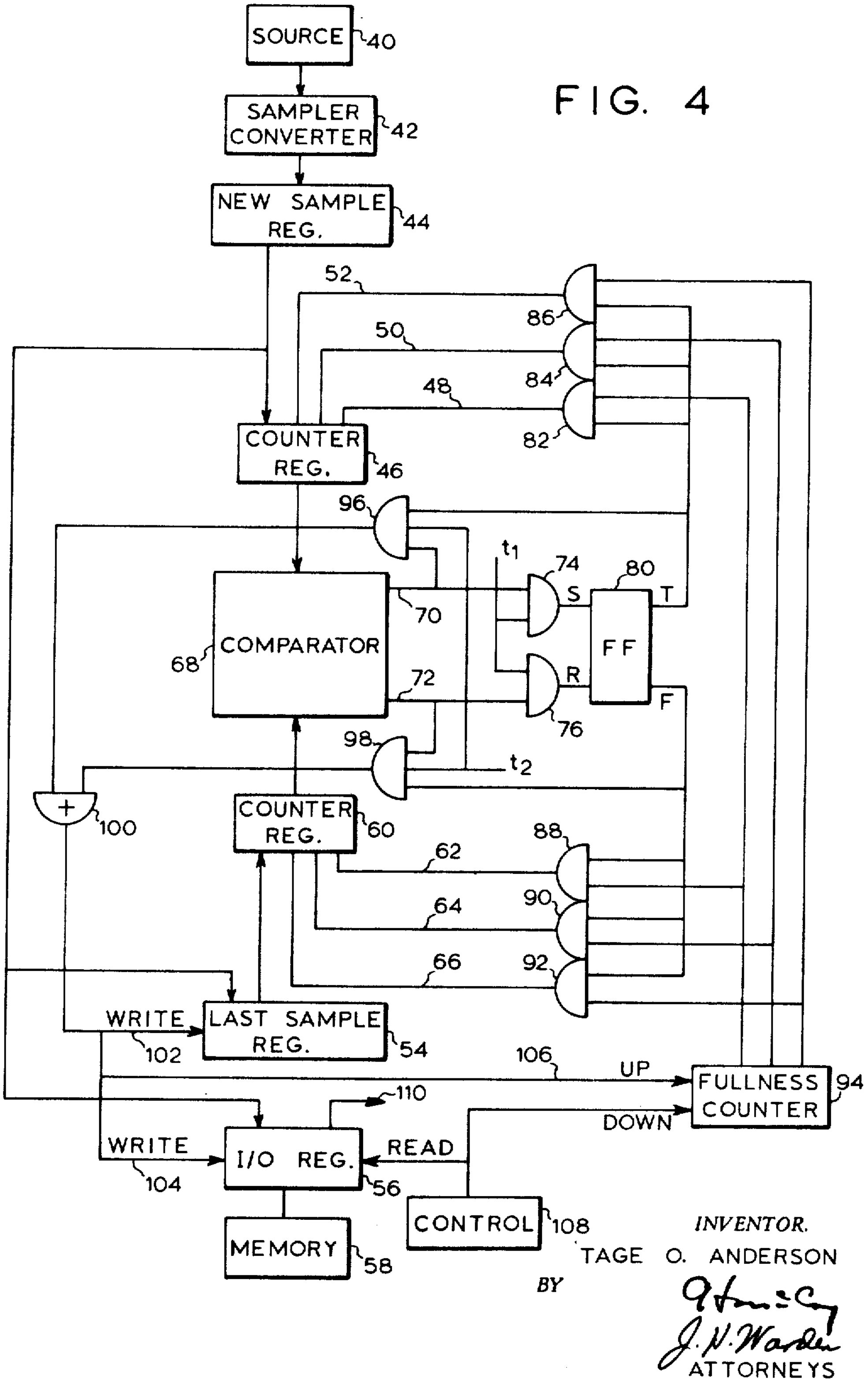
FIGURE 4 is a block diagram illustrating a preferred embodiment of the invention.

Attention is now called to FIGURE 1 which illustrates an arbitrary analog signal 10 which may for example be provided by a monitoring transducer on a spacecraft. The transducer may for example be monitoring temperature, voltage level, etc. In spacecraft and other applications, it is sometimes necessary to transmit the analog signal and recreate it at a location remote from the source thereof. In order to do this, the level of the signal 10 can be periodically sampled at times T0, T1, T2 . . . and each sample can then be converted by an analog to digital converter to a digital representation. Each digital representation can then be transmitted to a ground or control station.

In order to minimize the amount of data required to be transmitted and yet still provide sufficient data at the control station to effectively recreate the signal 10, it has become common practice to incorporate a data compression apparatus between the analog signal source and the transmission channel. The purpose of the data compression apparatus is to examine each new sample and determine whether it differs sufficiently from a prior sample to require transmission. In other words, considering the arbitrary signal 10 shown in FIGURE 1, it would be unnecesary to transmit the sample magnitudes taken at times T1–T5 inasmuch as these sample magnitudes would be substantial duplicates of the magnitude transmitted at time T0. However, since the level of the signal 10 at time T6 is substantially different from the level at time T5, it would indeed be necessary to transmit the sample magnitude taken at time T6. Similarly, the sample magnitudes taken at time T7 and T8 should be transmitted. However, since the samples taken at times T9, T10, and T11 are substantially identical to the sample taken at time T8, they can be discarded prior to transmission. For a new sample to be selected, it must differ from the previously selected sample by an amount greater than a defined aperture value.

FIGURE 2 illustrates a block diagram of a system which may be incorporated in a spacecraft for example for transmitting monitored data to a ground station. The system shown in FIGURE 1 responds to the output of an analog signal source 12 which for example could comprise a temperature transducer. The output of the signal source 12 is connected to a sampling and converting device 14. Briefly, the device 14, under the control of a timing and control means 16, periodically samples the signal provided by source 12 and converts the sample from an analog to a digital value which it presents to a compare means 18. The compare means 18 also receives an input from the input/output register 20 of a buffer memory 22. The input/output register 20 will store the digital representation of the last selected sample magnitude. The compare means 18 functions to compare the magnitude of each new sample provided by the device 14 with the magnitude of the last selected sample stored in the register 20. If the magnitude of the new sample differs from the magnitude of the last selected sample by an amount greater than an aperture value defined by aperture control 24, then the compare means 18 will enable a gate 26 to thus couple the new sample magnitude to the input/output register 20. In this manner, new sample magnitudes will be sequentially transferred to the buffer memory 22. The timing and control means 16 will periodically read sample magnitudes out of the buffer memory 22 through some gating means 28 for application to the transmission channel.

FIGURE 2 constitutes a block diagram which broadly describes prior art systems and system in which embodiments of the present invention can be incorporated. The present invention is specifically directed to an improved means for effecting the comparison between the new sample magnitude and the last selected sample magnitude to determine whether the new sample magnitude should be selected for transmission or discarded. In accordance with the invention, during a first time interval, the new sample magnitude 30 (FIGURE 3) is compared with the last selected sample magnitude 32 to determine which is smaller. The aperture value 34 shown in FIGURE 3(*b*) is then added to the smaller sample magnitude 32 and the modified magnitude is again compared with the sample magnitude 30. If sample magnitude 30 exceeds the modified magnitude, then it is clear that the new sample should be selected for insertion in the buffer memory 22. On the other hand, if the addition of the aperture value 34 to the smaller sample magnitude 32 resulted in a modified magnitude larger than sample magnitude 30, the new sample could be discarded.

It is pointed out that although the embodiment of the invention illustrated functions to add the aperture value to the smaller of the last selected sample and new sample magnitudes, it will be appreciated that embodiments of the invention can also be constructed in which the aperture value is subtracted from the larger of the last selected sample and new sample magnitudes.

Attention is now called to FIGURE 4 which illustrates a block diagram of a preferred embodiment of the invention. In FIGURE 4, analog signal source 40 provides an analog signal of the type shown in FIGURE 1 to a sampler and converter device 42 which sequentially provides digitally represented sample magnitudes to a new sample register 44. Although it is contemplated that the bits of the digitally represented sample magnitude be transfererd from the device 42 to the register 44 in parallel, the invention can function equally as well whether serial or parallel bit transfer is employed. The output of the new sample register is connected to a counter register 46. The counter register 46 is conventional and is comprised of a plurality of stages interconnected by carry means. Thus, as is well known, the binary integer "1" can be added to the magnitude stored in the register 46 by pulsing, as on terminal 48, the least significant stage of the register 46. Similarly, the integer quantity "2" can be added to the magnitude represented by the contents of register 46 by pulsing the next to least significant digit stage on line 50. By pulsing line 52 connected to the next more significant stage, the quantity "4" will be added to the digital represented magnitude stored in the register 46.

The output of the new sample register 44 is also connected to the input of a last selected sample register 54 and a memory input/output register 56. The register 56 constitutes the input/output register for a buffer memory 58. Thus, the contents of the new sample register 44 can be transferred to either the counter register 46, the last selected sample register 54, or the input/output register 56.

The output of the last selected sample register is connected to the input of a counter register 60 which can be constructed identically to the counter register 46. Thus, as was explained above, by pulsing line 62, the quantity "1" can be added to the contents of the counter register 60 and by pulsing lines 64 and 66, the quantities "2" and "4" can be respectively added to the contents of register 60.

The outputs of the counter registers 46 and 60 are connected to the inputs of a comparator device 68. Such comparators are well known in the art and can be provided with two output terminals 70 and 72 such that output terminal 70 is made logically true when the magnitude of counter register 60 exceeds the magnitude stored in counter register 46. On the other hand, when the magnitude stored in counter register 46 exceeds the magnitude stored in counter register 60, the output terminal 72 will be made logically true.

The output terminals 70 and 72 respectively connected to the input terminals of gates 74 and 76 which in turn are respectively connected to the set and reset input terminals of a flip-flop 80. The output terminal $t_1$ of a two-phase timing means (not shown) is also connected to the inputs of the gates 74 and 76.

From the portion of FIGURE 4 thus far described, it should be appreciated that new sample magnitudes are successively loaded into the register 44 and compared with the last selected sample magnitude stored in register 54 by the comparator 68. If the new sample magnitude is smaller than the magnitude of the last selected sample, the flip-flop 80 will be set. On the other hand, if the last selected sample magnitude is less than the magnitude of the new sample, the flip-flop 80 will be reset.

The true output terminal of flip-flop 80 is connected to the input of AND gates 82, 84, and 86. The false output terminal of flip-flop 80 is connected to the input of AND gates 88, 90, and 92.

The outputs of gates 82, 84, and 86 are respectively connected to the three least significant stages of the counter register 46 by lines 48, 50, and 52 respectively. Similarly, the output of gates 88, 90, and 92 are connected to the three least significant stages of counter register 60 by lines 62, 64, and 66 respectively.

A second input to each of the gates 82, 84, 86, 88, 90, and 92 is derived from a fullness counter 94. More particularly, the fulness counter is responsive to the fullness of buffer memory 58 and determines the aperture value which is added to the lesser of the new and last selected sample to determine whether a new sample should be selected for insertion into the buffer memory. This feature of the invention is based on the recognition that if the memory 58 is relatively empty due to the analog signal varying very slowly, it may be desired to transmit smaller magnitude changes than if the analog signal were varying rapidly and the memory 58 were relatively full. Accordingly, the fullness counter 94 as will be better explained hereinafter, indicates the fullness of memory 58 and establishes a high aperture value if the memory is reasonably full and a low aperture value if the memory is reasonably empty.

As should now be appreciated, during time interval $t_1$ defined by the two-phase timing means (not shown) the flip-flop 80 is either set or reset to enable one of the gates 82, 84, 86, 88, 90, and 92 to add the aperture value defined by the fullness counter 94 to the smaller of the new sample and last selected sample magnitudes respectively stored in registers 46 and 54.

At time $t_2$ defined by the two-phase timing means (now shown), the contents of the counter registers 46 and 60 are again compared to determine whether the smaller magnitude still resides in the same register as at time $t_1$. If it does, then the new sample magnitude must have differed from the last selected sample magnitude by greater than the aperture value and the contents of the new sample register 44 are transferred to the last sample register 54 and the input/output register 56.

The transfer control is implemented by providing gates 96 and 98 which are enabled at time $t_2$. The comparator output terminal 70 is connected to the input of gate 96 along with the true output terminal of flip-flop 80. Similarly, the output terminal 72 of comparator 68 is connected to the input of gate 98 along with the false output terminal of flip-flop 80. Thus, the gates 96 and 98 in conjunction with the flip-flop 80 determine whether or not the comparator 68 provided the same results at times $t_1$ and $t_2$. If it did, then one of the gates 96 or 98 will be enabled to thus enable OR gate 100 to accordingly apply a true logical signal to the write control terminals 102 and 104 of the registers 54 and 56 respectively. When a true logical signal is applied to the terminals 102 and 104, the output of the new sample register 44 is transferred to the registers 54 and 56. In addition, when this occurs a pulse is also supplied to the "up" terminal 106 of the fullness counter 94.

As pointed out in conjunction with FIGURE 2, some control means 108 is provided to read the memory 58 to successively apply sample magnitudes for transmission to the input/output register output terminal 110. Each read pulse provided by the control means 108 is also connected to the "down" input terminal of the fullness counter 94. Thus, the counter 94 will at all times indicate the fullness of the memory 58 and will define an aperture value based thereon.

From the foregoing, it should be appreciated that an extremely simple data compression apparatus has been disclosed herein for determining those samples out of a sequence of samples which differ from a previously selected sample by more than a defined aparture value. Additionally, the invention incorporates means for varying the aperture value dependent upon the fulness of the buffer memory.

What is claimed is:

1. Data compression apparatus for use with a source of sequentially provided digitally represented sample magnitudes, said apparatus comprising:

a first register for storing each new sample magnitude provided by said source;

a second register for storing a previously selected sample magnitude;

means for comparing said sample magnitudes respectively stored by said first and second registers;

timing means defining first and second sequential intervals;

means defining an aperture value;

means responsive to said comparing means during said first interval for modifying the sample magnitudes stored in one of said registers by said aperture value; and means for determining during said second interval whether the sample magnitudes stored in said registers bears the same relationship to one another as during said first interval.

2. The apparatus of claim 1 including means responsive to said determining means to determine that said magnitudes bear the same relationship during said second interval as during said first interval for storing said new sample magnitude in said second register.

3. The apparatus of claim 1 including a buffer memory; and means responsive to said determining means determining that said sample magnitudes stored in said first and second registers bear the same relationship during said second interval as during said first interval for storing said new sample magnitude in said buffer memory.

4. The apparatus of claim 3 including means indicating the fullness of said buffer memory; and means coupled to said fullness indicating means for controlling said means defining said aperture value.

5. In combination with an analog signal source and sampling means sequentially providing digitally represented sample magnitudes, a data compression means responsive to said sample magnitudes for selecting those which differ from the previously selected magnitudes by more than a defined aperture value, said data compression means comprising:

a first register for sequentially storing each of said sequentially provided magnitudes;

a second register for sequentially storing each of said selected magnitudes;

means defining first and second successive time intervals;

means defining an aperture value;

means active during said first interval for initially determining whether the smaller of said magnitudes is stored in said first or second register and for subsequently adding said aperture value thereto; and means active during said second interval for determining whether the register storing the smaller magnitude is the same as or different from the register storing said smaller magnitude during said first interval.

6. The combination of claim 5 including a first auxiliary register for storing each of said sequentially provided magnitudes;

a second auxiliary register for storing each of said selected magnitudes; and means responsive to the smaller magnitude being stored in the same one of said first and second registers during said first and second intervals for transferring the magnitude stored in said first auxiliary register to said second auxiliary register.

7. The combination of claim 6 including a buffer memory; and means for storing each of said magnitudes transferred to said second auxiliary register in said buffer memory.

8. The combination of claim 7 including means for indicating the fullness of said buffer memory; and means coupled to said fullness indicating means for controlling said means defining said aperture value.

9. The combination of claim 5 wherein each of said first and second registers constitutes a counter having a plurality of stages and carry means coupled between those stages; and wherein said means defining said aperture value includes a plurality of terminals each coupled to corresponding stages of said first and second registers and each coupled to a different stage in each of said first and second registers.

References Cited

UNITED STATES PATENTS

| | | | |
|---|---|---|---|
| 3,225,333 | 12/1965 | Vinal | 340—172.5 |
| 3,344,406 | 9/1967 | Vinal | 340—172.5 |

PAUL J. HENON, Primary Examiner

P. R. WOODS, Assistant Examiner